US011605264B2

(12) United States Patent
Markus et al.

(10) Patent No.: US 11,605,264 B2
(45) Date of Patent: Mar. 14, 2023

(54) COLLECTING AND LEVELLING UP PREDICTIONS AS COLLECTIBLE CARDS

(71) Applicant: GREENPARK SPORTS, INC., Burlingame, CA (US)

(72) Inventors: Shyam Markus, Porter Ranch, CA (US); Ken Martin, Oak Park, CA (US); Tim Bull, Belmont, CA (US)

(73) Assignee: GREENPARK SPORTS, INC., Burlingame, CA (US)

( * ) Notice: Subject to any disclaimer, the term of this patent is extended or adjusted under 35 U.S.C. 154(b) by 14 days.

(21) Appl. No.: 17/022,533

(22) Filed: Sep. 16, 2020

(65) Prior Publication Data

US 2021/0082228 A1 Mar. 18, 2021

Related U.S. Application Data

(60) Provisional application No. 62/901,719, filed on Sep. 17, 2019.

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *A63F 1/04* | (2006.01) |

(52) U.S. Cl.

CPC .............. *G07F 17/323* (2013.01); *A63F 1/04* (2013.01); *G07F 17/3244* (2013.01); *G07F 17/3288* (2013.01); *G07F 17/3293* (2013.01); *A63F 2001/0475* (2013.01)

(58) Field of Classification Search

CPC ... G07F 17/3232; G07F 17/3211; G07F 17/32
USPC ..................................... 463/1, 20, 22, 25, 30
See application file for complete search history.

(56) References Cited

U.S. PATENT DOCUMENTS

| | | | | |
|---|---|---|---|---|
| 5,662,332 | A | 9/1997 | Garfield | |
| 2003/0107173 | A1 | 6/2003 | Satloff et al. | |
| 2004/0044593 | A1 | 3/2004 | May | |
| 2007/0202952 | A1 | 8/2007 | Francis et al. | |
| 2013/0281173 | A1* | 10/2013 | Gilson .................. | A63F 13/235 273/293 |
| 2014/0364194 | A1* | 12/2014 | Kusano .................. | A63F 13/35 463/22 |

OTHER PUBLICATIONS

US/ISA—Notification of and International Search Report and Written Opinion from related International Appln. No PCT/2020/051044 dated Dec. 3, 2020; 9 pgs.

(Continued)

*Primary Examiner* — Adetokunbo O Torimiro
(74) *Attorney, Agent, or Firm* — Loeb & Loeb LLP

(57) ABSTRACT

Methods, systems, and storage media for playing a card game are disclosed. Exemplary implementations may: receive cards from a set of cards, individual cards of the set of cards representing a prediction of an outcome; assign a rarity level to individual cards of the set of cards; collect copies of the cards through winning predictions associated with individual cards; and upgrade the cards through the copies of the cards.

20 Claims, 7 Drawing Sheets

(56) References Cited

OTHER PUBLICATIONS

Sakamoto et al., “Augmenting remote trading card play.” In: Proceedings of ACM International Conference on Designing Interactive Systems (Poster). Jan. 2012—Retrieved on Nov. 9, 2020 from: https://www.researchgate.net/profile/Tatsuo_Nakajimapublication/294750599_Augmenting_Remote_Trading_Card_Play/links/56c3d79008ae8a6fab5a2de3/Augmenting-Remote-Trading-Card-Play.pdf, 2 pgs.

* cited by examiner

COLLECTING AND LEVELLING UP PREDICTIONS AS COLLECTIBLE CARDS

CROSS-REFERENCE TO RELATED APPLICATION

This present application claims the benefit of priority under 35 U.S.C. § 119(e) to U.S. Provisional Application No. 62/901,719, filed Sep. 17, 2019, the disclosure of which is hereby incorporated by reference in its entirety for all purposes.

TECHNICAL FIELD

The present disclosure generally relates to a card game, and more particularly to methods, systems, and storage media for collecting and levelling up predictions as collectible cards.

BACKGROUND

In traditional sports gaming, odds are presented to users as a menu of choices for a player. Players can pick from any of the offered predictions at any time, and the odds are set at the time the selection is made. There are no additional benefits a player can receive for having a favorite prediction that they play often.

BRIEF SUMMARY

One aspect of the present disclosure relates to a method for playing a card game. The method may include receiving cards from a set of cards, individual cards of the set of cards representing a prediction of an outcome. The method may include assigning a rarity level to individual cards of the set of cards. The rarity may determine a probability of receiving individual cards. The method may include collecting copies of the cards through winning predictions associated with individual cards. The method may include upgrading the cards through the copies of the cards.

In some implementations of the method, the rarity level may include at least one of common, rare, epic, or legendary.

In some implementations of the method, it may include receiving increased rewards through upgrading the cards.

In some implementations of the method, individual cards of the set of cards may include card properties. In some implementations of the method, the card properties may include at least one of a sport designation. In some implementations of the method, the rarity level, periods may be allowed, a level of the card, a name, a card description, a clue, or a maximum card limit.

In some implementations of the method, the upgrading may further include combining two or more of the copies of the cards together into an upgraded card.

In some implementations of the method, the upgraded card may include an increased rarity in the rarity level of the card.

In some implementations of the method, it may include acquiring the cards through an online store.

In some implementations of the method, it may include designating, through the rarity level of individual cards, a type of prediction. In some implementations of the method, the type of prediction may include at least one of money line, over/under, or spread.

Another aspect of the present disclosure relates to a system configured for playing a card game. The system may include one or more hardware processors configured by machine-readable instructions. The processor(s) may be configured to receive cards from a set of cards, individual cards of the set of cards representing a prediction of an outcome. The processor(s) may be configured to assign a rarity level to individual cards of the set of cards. The rarity may determine a probability of receiving individual cards. The processor(s) may be configured to collect copies of the cards through winning predictions associated with individual cards. The processor(s) may be configured to upgrade the cards through the copies of the cards.

Yet another aspect of the present disclosure relates to a non-transient computer-readable storage medium having instructions embodied thereon, the instructions being executable by one or more processors to perform a method for playing a card game. The method may include receiving cards from a set of cards, individual cards of the set of cards representing a prediction of an outcome. The method may include assigning a rarity level to individual cards of the set of cards. The rarity may determine a probability of receiving individual cards. The method may include collecting copies of the cards through winning predictions associated with individual cards. The method may include upgrading the cards through the copies of the cards.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
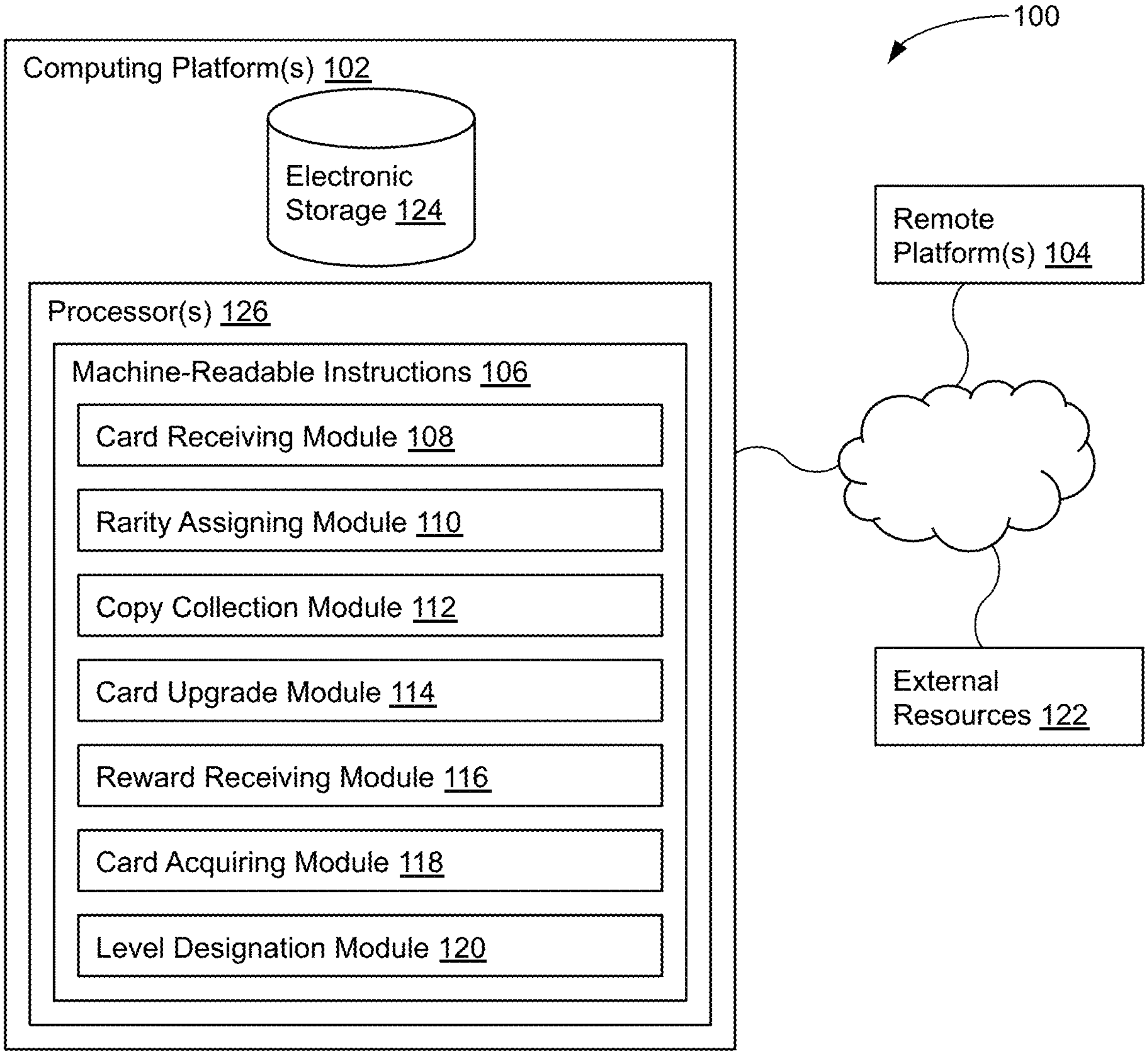
FIG. 1 illustrates a system configured for playing a card game, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

In traditional sports gaming, the odds are presented to users as a menu of choices for a player. Players can pick from any of the offered predictions at any time, and the odds are set at the time the choice is placed. There are no additional benefits a player can receive for having a favorite prediction that they play often.

Aspects of the present disclosure provide for a card collection system. For example, the card collection system may include the following features:

1. All predictions (e.g., propositions) may be represented as collectible cards that a player receives as rewards for playing the game.

2. These cards may all have an assigned rarity, which may dictate the odds of receiving the card. For example, there may be four major rarity levels: Common, Rare, Epic, and Legendary.

3. As players collect multiple copies of each card, they may level up the card, which makes the reward for winning the prediction represented on the card larger (e.g., by a multiplier, etc.).

Advantages of the card system includes incentives to not just win the predictions, but also to collect the predictions the player is most interested in (e.g., as a card), and level them up so the player may receive increased rewards for winning with them.

The disclosed system addresses a major issue with traditional predictions systems, which is that there is no inherent loyalty. This is because conventionally predictions are treated the same as each other, and players typically chase the best given odds.

In contrast, the disclosed card system, solves the above-described issue and creates player loyalty. This encourages users to continue to participate in predictions through the collectible card game. It is understood that the disclosed card game may be applied in either a non-wagering (e.g., no opportunity to win money/credits) and/or a wagering context.

According to aspects, card properties may include details regarding what at sport it can be applied to, rarity, period(s) allowed, level of card (e.g., multiplier effect on winnings), name of card, card description or clue as to what the card is about (e.g., for the user's collection or in a store before it may be utilized in a live game), and maximum number of units allowed.

According to aspects, the cards may be sold in a store (e.g., virtual store) and/or won as prizes (e.g., for successfully predicting the outcome of a selection). For example, each card may include an icon, a title, a rarity, a cost, and a level indicator. The level indicator may include a number held at the current level and a number required to level up.

According to aspects, a player may possess 12 cards out of 20 needed to level up. To get those 8 cards the player will need to buy them in the store and/or win them by playing the game. When played, the card may show the actual prediction along with potential payouts. For example, the played card may include an icon, title, rarity, level, question, option, wisdom of the crowd (e.g., odds as decided by the players, odds in general, etc.), potential green, and a boost selector.

According to aspects, once the player has collected enough copies of the card, they are able to upgrade the card. For example, upgrading (e.g., levelling up) may be accomplished by combining all of the cards and spending some currency (e.g., credits, free-to-play currency, etc.) that they have been collecting.

According to aspects, the cards may have a progression. For example, players will play games with their collection of cards. Every game they play results in winning more cards as rewards. They may also purchase cards directly from a store. Either way they acquire the cards, those cards become part of their collection. Once they have enough copies of a single card, they may upgrade that card, and once upgraded the card will help them win even better rewards when they play games with it.

According to aspects, the cards may include a progression of rarity from basic, to common, to rare, to epic, to legendary. For example, as cards become rarer, they may impact game play in three main ways: 1. rarer cards represent more advanced or exotic predictions, 2. rarer cards drop less frequently, and they are harder to get and harder to level up, and 3. rarer cards have increased pay outs. Because rarer cards are desirable, it increases the players desire to gain these cards in the game.

According to an aspect, basic cards may be the most common types of predictions most people will be familiar with. For example, there may be three cards in this set, which may be labelled "Chicken Dinner" (e.g., money line), "Combo Meal" (e.g., over/under), and "Mind the Gap" (e.g., spread). In an implementation, everyone may start the game with these cards and they may always be included as the first three cards listed in a first prediction period (e.g., Full Game/1st Q). Basic cards are in the common set but may be special because they're guaranteed to be in every game.

According to an aspect, common cards may be about both teams and may include two possible choices. Common cards may also include a "neither/none of the above" choice as well. In an implementation, everyone may receive the full set of common cards right away. Since everyone has these, each game may randomly select a set of common cards everyone will have access to for that game. Therefore, it may be easy to compare the basic and common cards to others for that game.

According to an aspect, rare and epic cards may include the most exotic predictions that usually have higher odds and therefore potentially bigger payouts. For example, rare and epic cards may provide for scenarios including who will score the first touchdown, will there be a turnover in the first 2 minutes of a prediction period, etc. In an implementation, players may only get these cards from specialized containers (e.g., lockers) or purchased through a store. When a game starts and the player uses one of these, it would not be the same as everyone else playing that game. Rare and epic cards may be limited in usage (e.g., to only one use per day, every 3 hours, etc.), no matter how many games are played that day. This is to prevent players from gaining an edge by playing their higher level cards too frequently while also forcing player agency and making them carefully select which game they deploy the card into.

According to an aspect, legendary cards may include exotic predictions (e.g., as exotic, or more so, than rare/epic cards). Legendary cards may also include an added bonus to make them extra effective, without overly affecting a skill level require to play and/or leaderboard status. For example, legendary cards may have "no option" predictions, which means the player is always predicting in the affirmative on the longshot. For example, a legendary card may designate that, "A player will score more than 40 points this game." Because the player is always making a longshot prediction with a ~5-15% chance of winning, legendary cards will pay half an initial bet amount back to the player if the player loses, along with any multipliers.

FIG. 1 illustrates a system 100 configured for playing a card game, according to certain aspects of the disclosure. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of card receiving module 108, rarity assigning module 110, copy collection module 112, card upgrade module 114, reward receiving module 116, card acquiring module 118, level designation module 120, and/or other instruction modules.

Card receiving module 108 may be configured to receive cards from a set of cards. Individual cards of the set of cards may represent a prediction of an outcome. The cards may be collectible cards. The cards may be virtual cards. The cards may be physical cards. In some implementations, individual virtual cards correspond to individual physical cards. The set of cards may include a static quantity of cards. The set of cards may include dynamic quantity of cards.

The set of cards may be associated with a live event. In some implementations, by way of non-limiting example, the live event may include one or more of a live sporting event, a live esports event, a live gaming event, a live race event, a live entertainment event, or a live political event. Individual cards of the set of cards may include card properties. In some implementations, the card properties may include at least one of a sport designation.

The cards may be received responsive to winning a card game. The cards may be received responsive to participating in a card game. The cards may be received responsive to completing a card game. The cards may be received responsive to beginning a new card game. The cards may be received responsive to correct predictions. The cards may be received responsive to player actions taken during a card game. The cards may be included within a locker or loot box. In some implementations, the locker or loot box may be received after completing a card game. In some implementations, the locker or loot box may include one or more new cards. In some implementations, cards included in the locker or loot box can be used in future card games.

The prediction may say or estimates whether the outcome will occur. The prediction may say or estimate whether the outcome will occur during the live event. The prediction may say or estimates whether the outcome will occur during a period within the live event. For example, the outcome may be Steph Curry getting 10 assists during this period. The outcome may be the MVP of a team scoring more than their season average number of assists during this game.

Rarity assigning module 110 may be configured to assign a rarity level to individual cards of the set of cards. The rarity level may be assigned to individual cards of the set of cards. The rarity may determine a probability of receiving individual cards. The probability may be associated with the likelihood of an outcome. The probability may be determined based on wisdom of the crowd. The probability may be determined based on historical statistics. The probability may be predetermined. The probability may be a dynamic value. The probability may be a static value. The probability may be adjusted for margins. The probability may be not adjusted for margins. By way of non-limiting example, the rarity level may include at least one of common, rare, epic, or legendary. The rarity level may include a numerical value. The rarity level may include one of a set of symbols or names. By way of non-limiting example, the rarity level, periods may be allowed, a level of the card, a name, a card description, a clue, or a maximum card limit. In some implementations, an appearance may be standardized for different cards having the same rarity level.

Copy collection module 112 may be configured to collect copies of the cards through winning predictions associated with individual cards. In some implementations, duplicate copies of a given card cannot be collected. In some implementations, duplicate copies of a given card can be collected. In some implementations, a given copy of a card may remain in a collection once collected. In some implementations, a given copy of a card may remain in a collection after being played. In some implementations, a given copy of a card may be removed from a collection once played.

Card upgrade module 114 may be configured to upgrade the cards through the copies of the cards. In some implementations, the upgraded card may have a new rarity level. The upgrading may further include combining two or more of the copies of the cards together into an upgraded card. The upgraded card may include an increased rarity in the rarity level of the card. The new rarity level may be determined based on rarity levels of the two or more of the copies of cards combine into the upgraded card. In some implementations, the upgraded card may have a new appearance. The new appearance may be different from that of the two or more of the copies of cards combine into the upgraded card. In some implementations, by way of non-limiting example, an appearance may include one or more of a color, a texture, or a border design.

Reward receiving module 116 may be configured to receive increased rewards through upgrading the cards. Rewards may include one or more of receiving new cards, receiving virtual in-game currency, levelling up cards, and/or other rewards. In some implementations, rewards may be increased based on increased rarity level.

Card acquiring module 118 may be configured to acquire the cards through an online store. The cards may be acquired through the online store using an in-game virtual currency. The in-game virtual currency can be purchased using real money. The in-game virtual currency can be obtained for free by playing the card game. The in-game virtual currency may be only usable within a single card game.

Level designation module 120 may be configured to designate, through the rarity level of individual cards, a type of prediction. By way of non-limiting example, the type of prediction may include at least one of money line, over/under, or spread.

In some implementations, computing platform(s) 102, remote platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 122 may be operatively linked via some other communication media.

A given remote platform 104 may include one or more processors configured to execute computer program modules. The computer program modules may be configured to enable an expert or user associated with the given remote platform 104 to interface with system 100 and/or external resources 122, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Computing platform(s) 102 may include electronic storage 124, one or more processors 126, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 124 may comprise non-transitory storage media that electronically stores information. The electronic storage media of electronic storage 124 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from computing platform(s) 102, information received from remote platform(s) 104, and/or other information that enables computing platform(s) 102 to function as described herein.

Processor(s) 126 may be configured to provide information processing capabilities in computing platform(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute modules 108, 110, 112, 114, 116, 118, and/or 120, and/or other modules. Processor(s) 126 may be configured to execute modules 108, 110, 112, 114, 116, 118, and/or 120, and/or other modules by software; hardware; firmware; some combination of software, hardware, and/or firmware; and/or other mechanisms for configuring processing capabilities on processor(s) 126. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, and/or 120 are illustrated in FIG. 1 as being implemented within a single processing unit, in implementations in which processor(s) 126 includes multiple processing units, one or more of modules 108, 110, 112, 114, 116, 118, and/or 120 may be implemented remotely from the other modules. The description of the functionality provided by the different modules 108, 110, 112, 114, 116, 118, and/or 120 described below is for illustrative purposes, and is not intended to be limiting, as any of modules 108, 110, 112, 114, 116, 118, and/or 120 may provide more or less functionality than is described. For example, one or more of modules 108, 110, 112, 114, 116, 118, and/or 120 may be eliminated, and some or all of its functionality may be provided by other ones of modules 108, 110, 112, 114, 116, 118, and/or 120. As another example, processor(s) 126 may be configured to execute one or more additional modules that may perform some or all of the functionality attributed below to one of modules 108, 110, 112, 114, 116, 118, and/or 120.

Figure 2A:
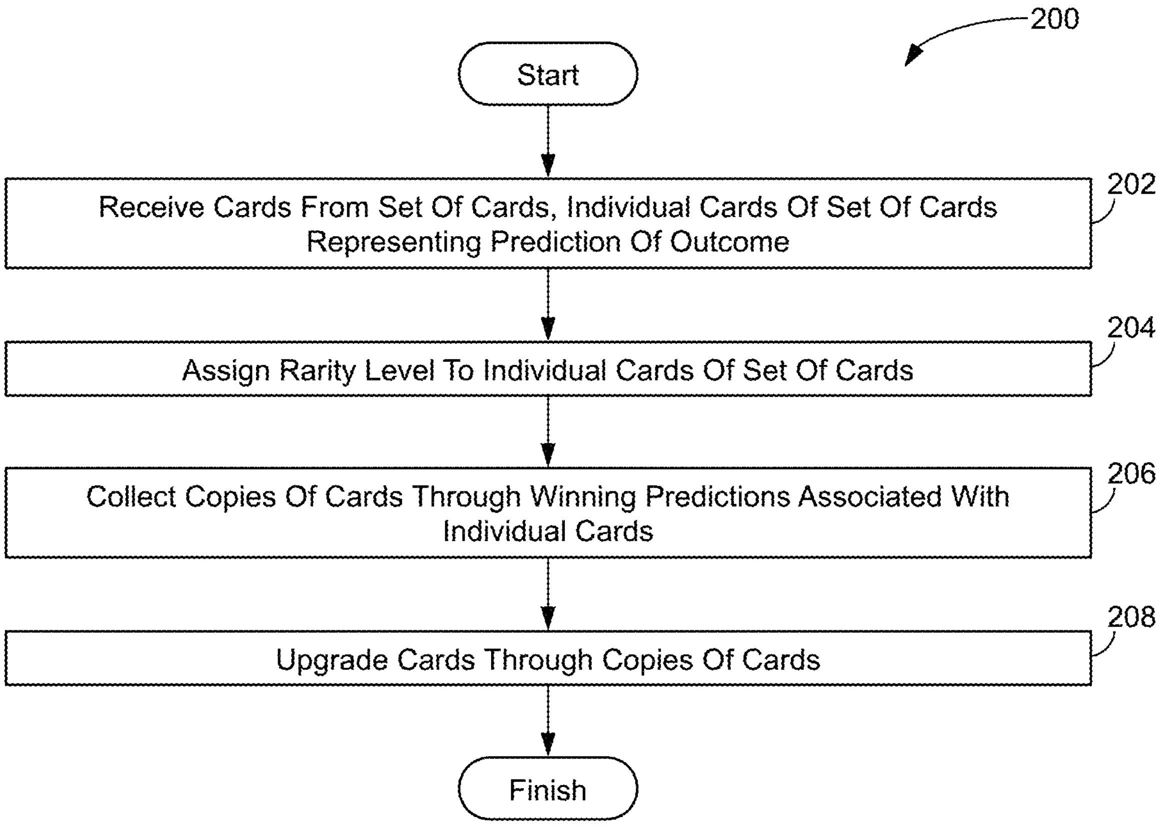
FIGS. 2A, 2B, 2C, and/or 2D an example flow diagram for playing a card game, according to certain aspects of the disclosure.
Figure 2B:
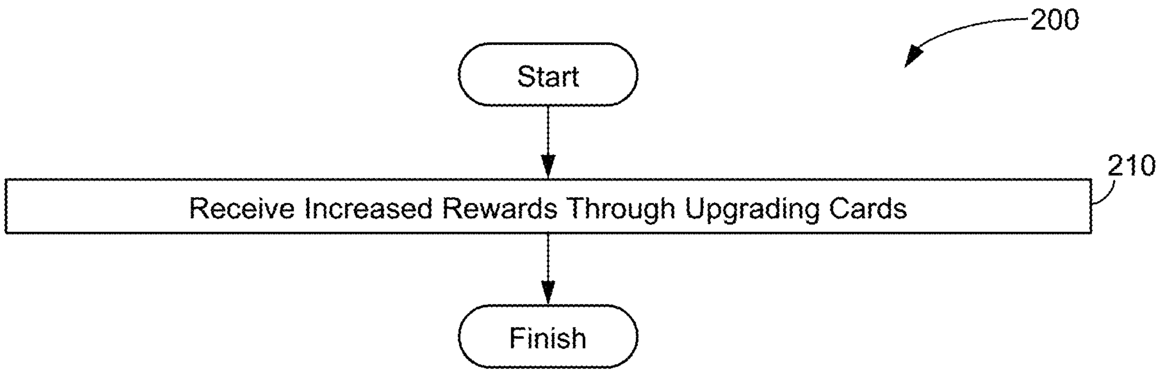
Figure 2C:
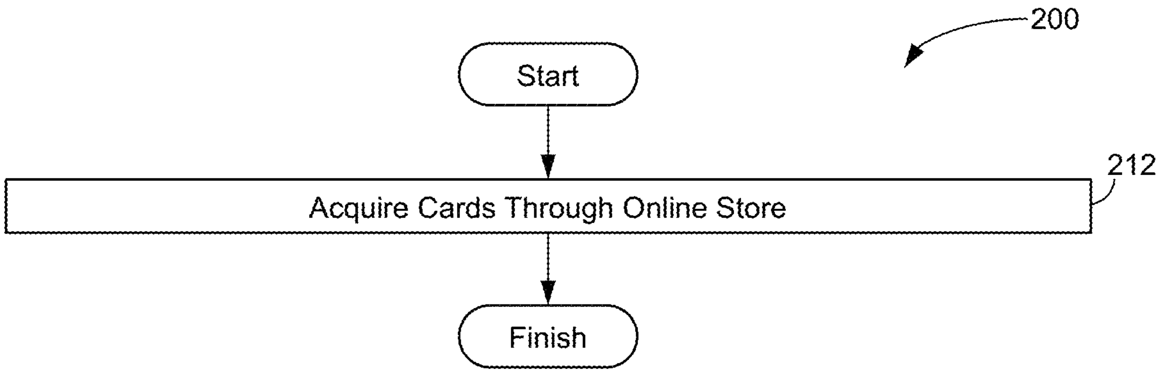

FIGS. 2A, 2B, 2C, and/or 2D an example flow diagram (e.g., process 200) for playing a card game, according to certain aspects of the disclosure. For explanatory purposes, the example process 200 is described herein with reference to FIG. 1. Further for explanatory purposes, the steps of the example process 200 are described herein as occurring in serial, or linearly. However, multiple instances of the example process 200 may occur in parallel. For purposes of explanation of the subject technology, the process 200 will be discussed in reference to FIG. 1.

FIG. 2A illustrates method 200, in accordance with one or more implementations.

At step 202, the process 200 may include receiving cards from a set of cards, individual cards of the set of cards representing a prediction of an outcome. Step 202 may be performed by one or more hardware processors configured by machine-readable instructions including a module that is the same as or similar to card receiving module 108, according to certain aspects of the disclosure.

At step 204, the process 200 may include assigning a rarity level to individual cards of the set of cards. The rarity may determine a probability of receiving individual cards. The rarity level may be assigned to individual cards of the set of cards. Step 204 may be performed by one or more hardware processors configured by machine-readable instructions including a module that is the same as or similar to rarity assigning module 110, according to certain aspects of the disclosure.

At step 206, the process 200 may include collecting copies of the cards through winning predictions associated with individual cards. Step 206 may be performed by one or more hardware processors configured by machine-readable instructions including a module that is the same as or similar to copy collection module 112, according to certain aspects of the disclosure.

At step 208, the process 200 may include upgrading the cards through the copies of the cards. Step 208 may be performed by one or more hardware processors configured by machine-readable instructions including a module that is the same as or similar to card upgrade module 114, according to certain aspects of the disclosure.

FIG. 2B illustrates method 200, in accordance with one or more implementations.

At step 210, the process 200 may include receiving increased rewards through upgrading the cards. Step 210 may be performed by one or more hardware processors configured by machine-readable instructions including a module that is the same as or similar to reward receiving module 116, according to certain aspects of the disclosure.

FIG. 2C illustrates method 200, in accordance with one or more implementations.

At step 212, the process 200 may include acquiring the cards through an online store. The cards may be acquired through the online store using an in-game virtual currency. The in-game virtual currency can be purchased using real money. The in-game virtual currency can be obtained for free by playing the card game. The in-game virtual currency may be only usable within a single card game. Step 212 may be performed by one or more hardware processors configured by machine-readable instructions including a module that is the same as or similar to card acquiring module 118, according to certain aspects of the disclosure.

Figure 2D:
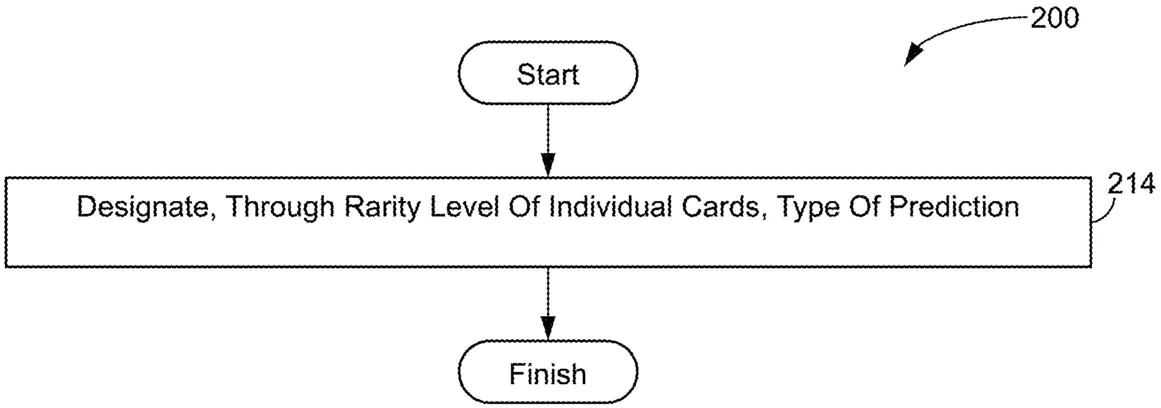

FIG. 2D illustrates method 200, in accordance with one or more implementations.

At step 214, the process 200 may include designating, through the rarity level of individual cards, a type of prediction. The type of prediction may include at least one of money line, over/under, or spread. Step 214 may be performed by one or more hardware processors configured by machine-readable instructions including a module that is the same as or similar to level designation module 120, according to certain aspects of the disclosure.

Figure 3A:
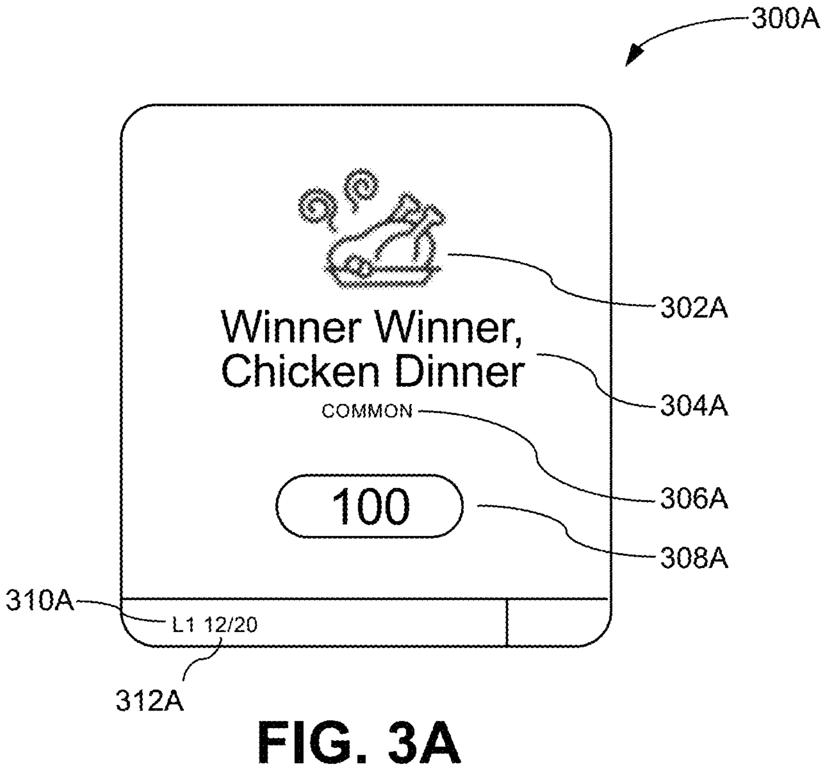
FIGS. 3A, 3B, and/or 3C illustrate example cards that may be collected and levelled up, according to certain aspects of the disclosure.
Figure 3B:
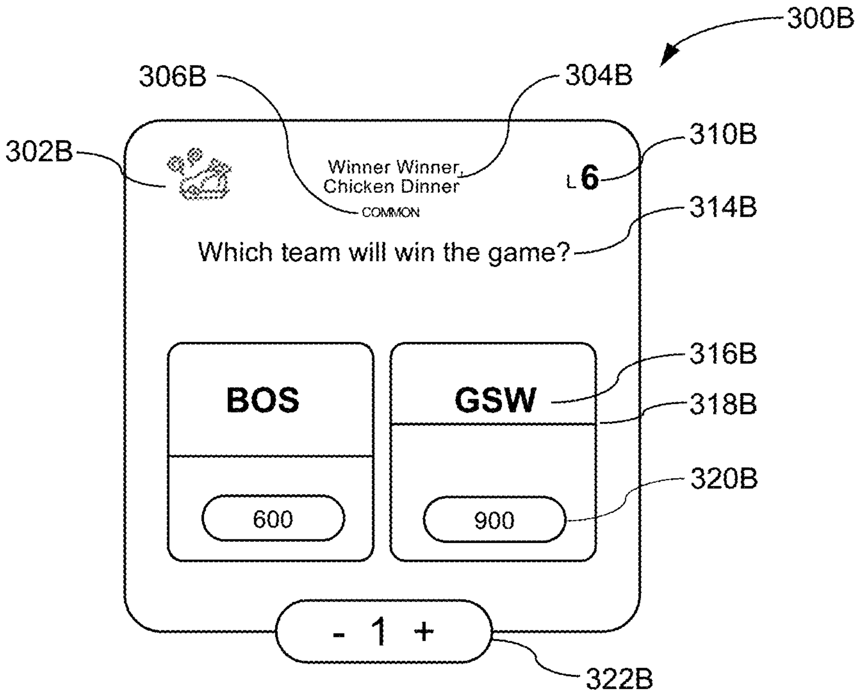
Figure 3C:
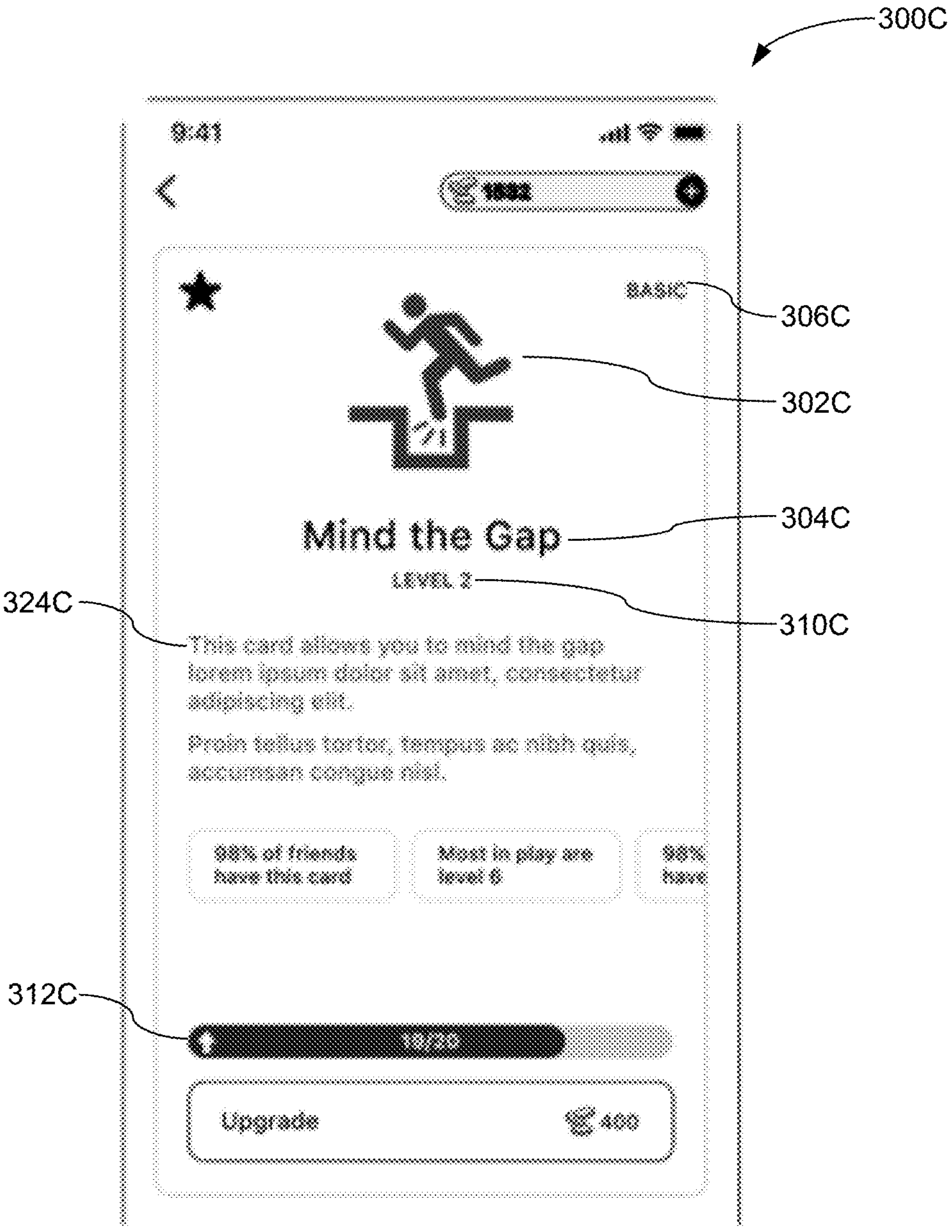

FIGS. 3A, 3B, and/or 3C illustrate example cards (e.g., cards 300A, 300B, and/or 300C; collectively, card 300) that may be collected and levelled up, according to certain aspects of the disclosure. The card 300 may include an icon (e.g., 302A, 302B, 302C). The icon may be configured to identify a type of card. The card 300 may include a title (e.g., 304A, 304B, 304C). The title may be configured to identify a type of a type of prediction. The type of prediction may include one or more of money line, over/under, spread, and/or other types of predictions. The card 300 may include a rarity level (e.g., 306A, 306B, 306C). The card 300 may include a cost (e.g., 308A). The cost may include an amount of virtual currency required to purchase the card 300 via a store. The card 300 may include a level (e.g., 310A, 310B, 310C). The card 300 may visually convey a number of cards held and a number of cards required to level up (e.g., 312A, 312C). The card 300 may include a question regarding an outcome (e.g., 314B). The card 300 may include an option regarding an outcome, e.g., which team will win (e.g., 316B). The card 300 may visually convey wisdom of the crowd, e.g., how many players believe a given team will win (e.g., 318B). The card 300 may include a potential award, e.g., potential green (e.g., 320B).

The card 300 may include a boost selector (e.g., 322B). In some implementations, the boost selector may depend on a player's level in a game. The boost selector may include a set number of prediction units to use for each prediction period. An NBA game, for example, may have four prediction periods. Those four prediction periods may include the full game plus the first quarter, the second quarter, the third quarter, and the fourth quarter. There may be a fixed amount of prediction units per prediction period. Players may be incentivized to use all of their prediction units when the prediction units are received. In some implementations, when a player makes a prediction on a card, the player may use one prediction unit. A player may be able to add more prediction units to a single card. "Boost" may refer to additional prediction units added to a given card. A player may be able to add all of their available prediction units to a single card during one prediction period. The card 300 may include a description of the card 300 or aspects of the card 300 (e.g., 324C).

Figure 4:
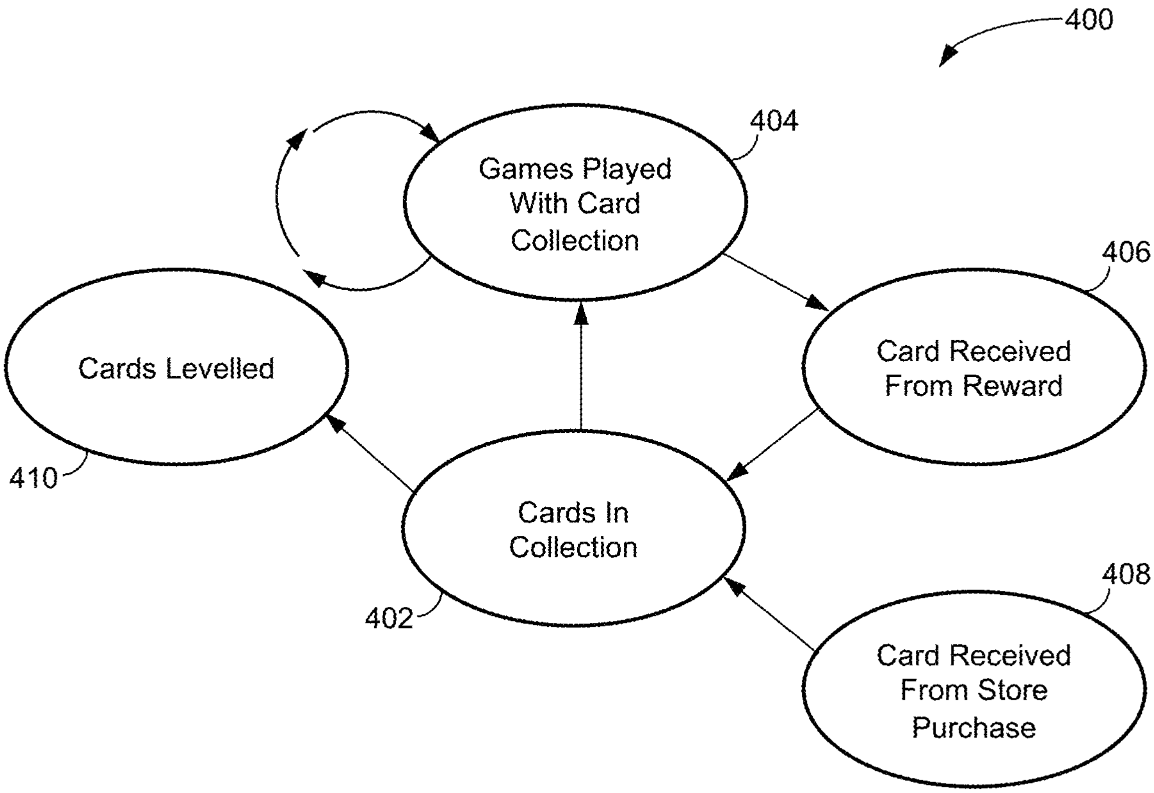
FIG. 4 illustrates an example lifecycle of cards, according to certain aspects of the disclosure.

FIG. 4 illustrates an example lifecycle 400 of cards, according to certain aspects of the disclosure. Cards in a player's collection (e.g., 402) may be used to play a game (e.g., 404). The player may receive new cards through gameplay as rewards (e.g., 406). The player may receive new cards by purchasing them via a store (e.g., 408). The player's new cards may be added to their collection of cards. Once there are enough cards in the player's collection of cards, one or more cards may be levelled. Cards in the players collection may be used in future games.

Figure 5:
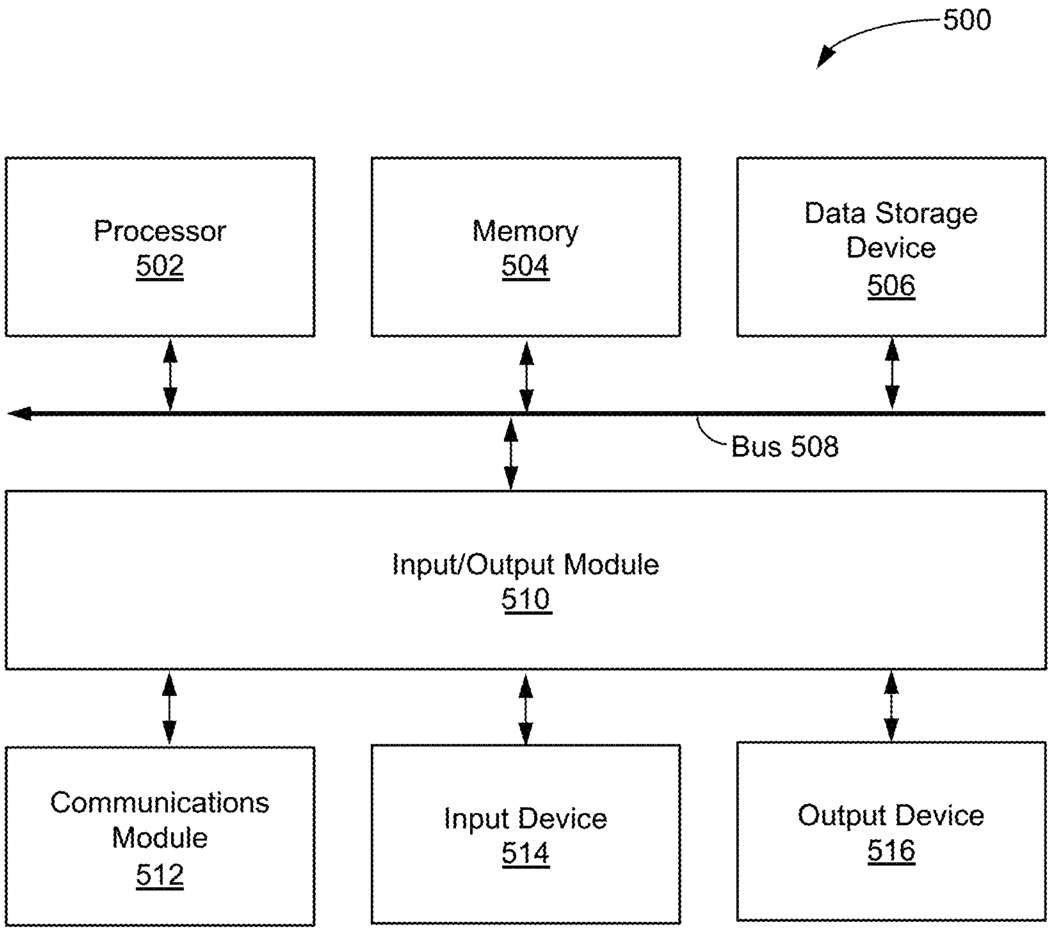
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504.

Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method of operating a gaming device for playing a card game, the gaming device having a processor and a memory with processor-executable instructions for one or more modules executed by the processor, the processor-executable instructions comprising:

receiving cards from a set of cards via a card receiving module of the gaming device, individual cards of the set of cards representing a prediction of an outcome;

assigning a rarity level to individual cards of the set of cards via a rarity assigning module of the gaming device, the rarity determining a probability of receiving individual cards;

collecting copies of the cards through winning predictions associated with individual cards via a copy collection module of the gaming device; and upgrading one or more individual cards upon collecting enough copies of a card through both the received cards and the collected copies of the cards via a card upgrade module of the gaming device.

2. The method of claim 1, wherein the rarity level comprises at least one of common, rare, epic, or legendary.

3. The method of claim 1, further comprising:

receiving increased rewards via a reward receiving module through upgrading the cards.

4. The method of claim 1, wherein individual cards of the set of cards comprise card properties, wherein the card properties comprise at least one of a sport designation, the rarity level, periods allowed, a level of the card, a name, a card description, a clue, or a maximum card limit.

5. The method of claim 1, wherein the upgrading further comprises combining two or more of the copies of the cards together into an upgraded card via the card upgrade module of the gaming device.

6. The method of claim 1, wherein the upgraded card comprises an increased rarity in the rarity level of the card.

7. The method of claim 1, further comprising:

acquiring the cards through an online store via the card receiving module of the gaming device.

8. The method of claim 1, further comprising:

designating, through the rarity level of individual cards, a type of prediction, wherein the type of prediction comprises at least one of money line, over/under, or spread via a level designation module of the gaming device.

9. A system configured for playing a card game, the system comprising:

one or more hardware processors configured by machine-readable instructions to:

receive cards from a set of cards, individual cards of the set of cards representing a prediction of an outcome;

assign a rarity level to individual cards of the set of cards, the rarity determining a probability of receiving individual cards;

collect copies of the cards through winning predictions associated with individual cards; and upgrade one or more individual cards upon collecting enough copies of a card through both the received cards and the collected copies of the cards.

10. The system of claim 9, wherein the rarity level comprises at least one of common, rare, epic, or legendary.

11. The system of claim 9, wherein the one or more hardware processors are further configured by machine-readable instructions to:

receive increased rewards through upgrading the cards.

12. The system of claim 9, wherein individual cards of the set of cards comprise card properties, wherein the card properties comprise at least one of a sport designation, the rarity level, periods allowed, a level of the card, a name, a card description, a clue, or a maximum card limit.

13. The system of claim 9, wherein the upgrading further comprises combining two or more of the copies of the cards together into an upgraded card.

14. The system of claim 9, wherein the upgraded card comprises an increased rarity in the rarity level of the card.

15. The system of claim 9, wherein the one or more hardware processors are further configured by machine-readable instructions to:

acquire the cards through an online store.

16. The system of claim 9, wherein the one or more hardware processors are further configured by machine-readable instructions to:

designate, through the rarity level of individual cards, a type of prediction, wherein the type of prediction comprises at least one of money line, over/under, or spread.

17. A non-transient computer-readable storage medium having instructions embodied thereon, the instructions being executable by one or more processors to perform a method for playing a card game, the method comprising:

receiving cards from a set of cards, individual cards of the set of cards representing a prediction of an outcome;

assigning a rarity level to individual cards of the set of cards, the rarity determining a probability of receiving individual cards;

collecting copies of the cards through winning predictions associated with individual cards; and upgrading one or more individual cards upon collecting enough copies of a card through both the received cards and the collected copies of the cards.

18. The computer-readable storage medium of claim 17, wherein the rarity level comprises at least one of common, rare, epic, or legendary.

19. The computer-readable storage medium of claim 17, wherein the method further comprises:

receiving increased rewards through upgrading the cards.

20. The computer-readable storage medium of claim 17, wherein individual cards of the set of cards comprise card properties, wherein the card properties comprise at least one of a sport designation, the rarity level, periods allowed, a level of the card, a name, a card description, a clue, or a maximum card limit.

* * * * *